UNITED STATES PATENT OFFICE.

WILLIAM D. FOSS, OF CENTRALIA, WASHINGTON.

WOOD-PRESERVATIVE.

1,183,967.     Specification of Letters Patent.     Patented May 23, 1916.

No Drawing.     Application filed May 21, 1913. Serial No. 768,988.

*To all whom it may concern:*

Be it known that I, WILLIAM D. FOSS, of Centralia, in the county of Lewis and State of Washington, a citizen of the United States, have invented a new and useful Improvement in Wood-Preservatives, of which the following is a full, clear, and exact description.

My invention relates to a composition for preserving wood and especially wood that is subjected to the influence of salt water and animal life incident thereto.

The object of my invention is to provide a preservative that will not only preserve the wood, but also harden it.

The composition constituting my invention is preferably prepared in the following manner by combining the ingredients in the manner and in substantially the proportions stated. $2\frac{1}{4}$ pounds of copper sulfate are dissolved in $2\frac{1}{2}$ gallons of lime water (a solution of lime in water). $4\frac{1}{2}$ ounces of zinc sulfate, $2\frac{1}{2}$ ounces of iron sulfate and 6 ounces of sulfuric acid are added to $1\frac{1}{2}$ gallons of lime water. The two solutions are then mixed together. It is probable that a portion of the sulfuric acid will unite with all the lime forming calcium sulfate and leaving some sulfuric acid in the solution.

The composition is applied to the wood by soaking the wood therein or by brushing the solution upon the surface of the wood.

What I claim is:—

The herein described composition for preserving and hardening wood, the same comprising approximately 2 pounds of copper sulfate, $4\frac{1}{2}$ ounces of zinc sulfate, $2\frac{1}{4}$ ounces of iron sulfate, not more that $1\frac{1}{4}$ ounces of calcium sulfate and not less than about $4\frac{1}{2}$ ounces of sulfuric acid, all dissolved in 4 gallons of water.

WILLIAM D. FOSS.

Witnesses:
GEO. C. ELLSBURY,
JAS. GILCHRIST.